(12) United States Patent
Soffer

(10) Patent No.: US 9,014,000 B2
(45) Date of Patent: Apr. 21, 2015

(54) ADAPTIVE TRAFFIC MANAGER FOR WIRELESS APPLICATIONS

(75) Inventor: Ran Soffer, Tel-Mond (IL)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/346,198

(22) Filed: Jan. 9, 2012

(65) Prior Publication Data

US 2013/0094365 A1    Apr. 18, 2013

Related U.S. Application Data

(60) Provisional application No. 61/547,344, filed on Oct. 14, 2011.

(51) Int. Cl.
*H04L 1/00* (2006.01)
*H04L 12/811* (2013.01)
*H04L 12/801* (2013.01)

(52) U.S. Cl.
CPC .............. *H04L 1/0002* (2013.01); *H04L 47/14* (2013.01); *H04L 47/17* (2013.01); *H04L 47/38* (2013.01)

(58) Field of Classification Search
USPC .............. 370/206, 236, 230.1, 316, 338, 231, 370/468; 455/561; 714/752; 709/224
See application file for complete search history.

(56) References Cited

U.S. PATENT DOCUMENTS 5,229,992 A * 7/1993 Jurkevich et al. ............. 370/468
7,525,915 B2    4/2009 Zaki et al.
8,050,292 B2   11/2011 Wu
2005/0075078 A1   4/2005 Makinen et al.
2006/0187835 A1   8/2006 Ahn et al.
2006/0239188 A1  10/2006 Weiss et al.
2008/0090575 A1 * 4/2008 Barak et al. ................... 455/444

(Continued)

FOREIGN PATENT DOCUMENTS

TW    201018288 A1    5/2010
TW       I349460       9/2011

(Continued)

OTHER PUBLICATIONS

European Search Report for EP Application No. EP 12 00 7024, Munich, Germany, mailed on Sep. 12, 2013.
Office Action directed to related Taiwanese Patent Application No. 101137428, mailed Sep. 25, 2014; 10 pages.

*Primary Examiner* — Andrew Lai
*Assistant Examiner* — Jamaal Henson
(74) *Attorney, Agent, or Firm* — Sterne, Kessler, Goldstein & Fox P.L.L.C.

(57) ABSTRACT

An adaptive traffic manager assembly, which includes a computing module configured to operate on a current adaptive traffic manager configuration, and includes an adapting mechanism configured to adaptively change the current adaptive traffic manager configuration according to current wireless link conditions, a current Adaptive Coding and Modification (ACM) profile, or upon detection of an ACM event, and further includes a switch assembly configured to receive a first signal over a wired link and to output a second signal over a wireless link, and configured to store the current adaptive traffic manager configuration, and is further configured to automatically change a modulation and coding scheme associated with the current adaptive traffic manager configuration upon receiving an instruction from the computing module, in response to the detection of the ACM event.

23 Claims, 6 Drawing Sheets

(56) References Cited

U.S. PATENT DOCUMENTS

2008/0259792 A1* 10/2008 Cimini et al. .............. 370/230.1
2010/0185918 A1* 7/2010 Ashkenazi et al. ........... 714/752
2012/0008496 A1* 1/2012 Saavedra ...................... 370/231
2013/0028080 A1* 1/2013 Rao et al. ...................... 370/230

FOREIGN PATENT DOCUMENTS

| WO | WO 99/39468 | 8/1999 |
| WO | WO 03/034639 A1 | 4/2003 |

* cited by examiner

ADAPTIVE TRAFFIC MANAGER FOR WIRELESS APPLICATIONS

CROSS-REFERENCE TO RELATED APPLICATIONS

This patent application claims the benefit of U.S. Provisional Patent Application No. 61/547,344, filed Oct. 14, 2011, which is incorporated herein by reference in its entirety.

BACKGROUND OF THE INVENTION

1. Field of the Invention

The invention relates to adaptive traffic management, and more specifically to an adaptive link traffic manager.

2. Related Art

Traditionally, the majority of consumer demand in the area of mobile backhaul networking has been directed to voice services. However, recently the market for mobile backhaul services has begun to change. In particular, the mobile backhaul space is experiencing a growing demand for increased capacity as well as a shift from voice services to data services. These factors are driving mobile backhaul networks towards high capacity IP/Ethernet connections.

Similarly, mobile backhaul networking is experiencing a transition to 4G and LTE networks. This transition is also driving the need for higher capacity, and packet traffic in mobile backhaul networks.

However, there is an inherent problem associated with the wireless connections that make up these mobile backhaul networks. Specifically, in wireless connections, unlike wired connections, such as fiber optic cable, or copper cable, to provide some examples, link capacity may change for various reasons including, for example, environmental conditions. Therefore, as mobile backhaul networks continue to transition to 4G and LTE networks, and as systems rely more and more on these wireless links, it is increasingly becoming a problem to cope with these changing link conditions. Thus, there is a need for a traffic management device that can adapt by altering settings as necessary according to wireless link conditions.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
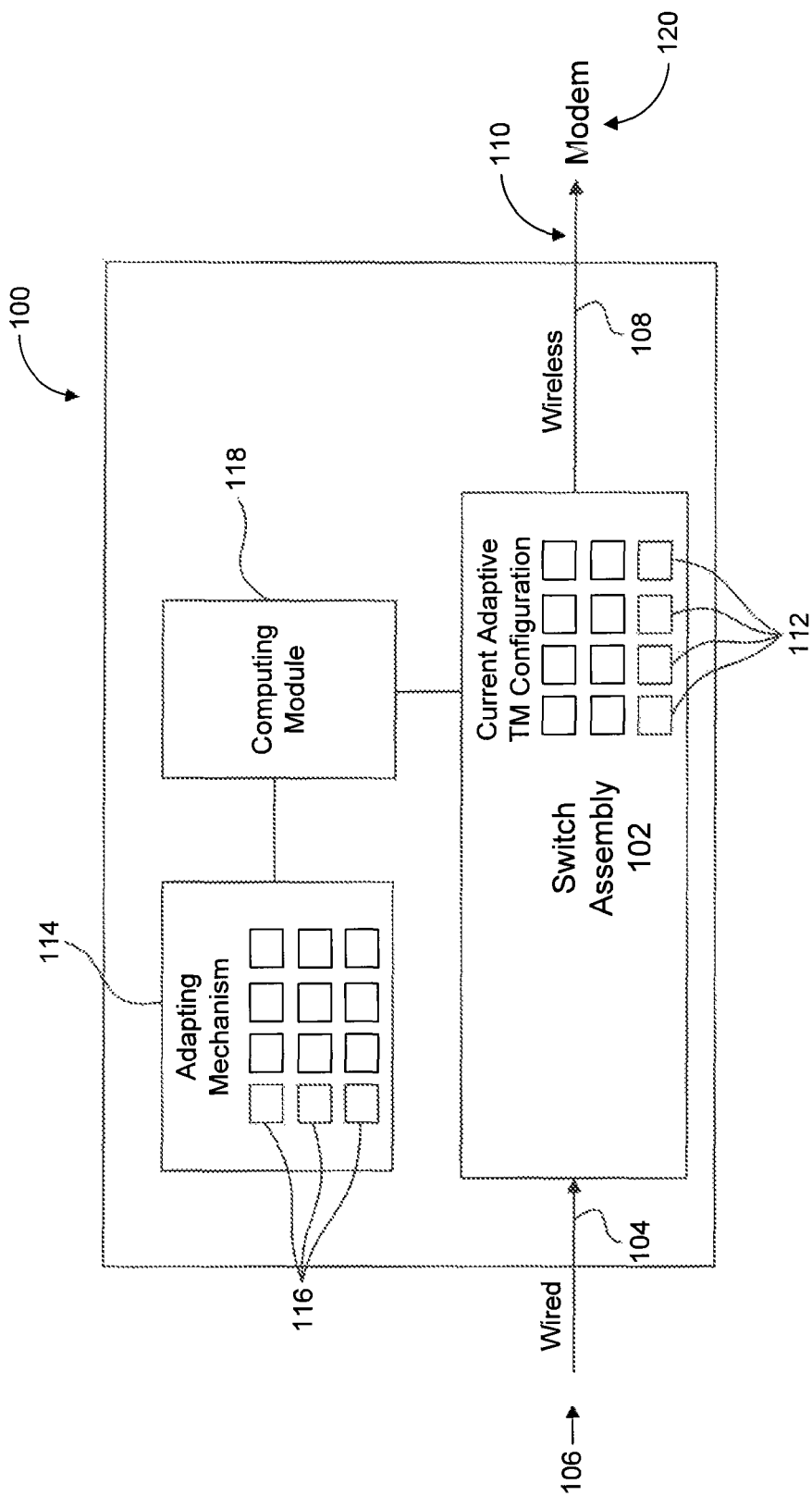
FIG. 1 is a block diagram of an Adaptive Code and Modulation (ACM) aware traffic manager according to an exemplary embodiment of the invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of wireless communication, those skilled in the relevant art(s) will recognize that the present invention may be applicable to other communications that use wired or other types of wireless communication without departing from the spirit and scope of the present invention.

As discussed previously in this disclosure, in wireless connections, unlike wired connections, such as fiber optics, or copper wiring, to provide some examples, link capacities may change according to environmental conditions. For microwave transmissions, Adaptive Code and Modulation (ACM) techniques may be introduced using Broadcom Corporation PVG310 modem or PVG610 modern, to provide some examples; however, other devices may be used without departing from the spirit and scope of the present disclosure. Also, in packet based networks, a traffic manager (TM) or Hierarchical-TM (H-TM) supports Quality of Service (QoS) and Service Level Agreements (SLA) by managing outgoing packets from an egress port. In this case, the TM assumes that a physical-layer or a link capacity does not change over time. This is due to the fact that the TM was designed and built for wired connections that do not have a changing link capacity over time (as the link conditions are constant).

The evolution of wireless backhaul from time division multiplexed (TDM) based to packet based traffic requires including a TM to manage the packet stream. The ability to change TM settings according to ACM events, such as link capacity changes to provide an example, in microwave systems will enable a more optimized solution as it introduces an additional dimension (adaptive TM) to the TM. This additional dimension is the ability for the adaptive TM to change its settings according to changes in the link capacity. Therefore, the present disclosure provides an ability to optimize packet traffic over a link having an adaptive capacity.

Adaptive Coding and Modification (ACM) refers to the automatic adjustment that a wireless system can make in order to optimize over-the-air transmission and prevent weather-related fading from causing communication on the link to be disrupted. When extreme weather conditions, such as a storm, affect the transmission and receipt of data and voice over the wireless network, an ACM-enabled radio system automatically changes modulation and/or coding allowing real-time applications to continue to run uninterrupted. The adjustment of radio capacity requires dynamic adaption of a traffic manager within a very short time (in most cases less than a millisecond). Although the present disclosure may refer an ACM aware TM or an ACM-enabled TM, these are provided for illustrative purposes only, and they are not intended to be the only types of traffic managers capable of being used herein, and they are not meant to limit this disclosure. In particular, a person having ordinary skill in the art(s) would recognize that any traffic manager having an adaptive link, an adaptive physical connection, or an adaptive physical layer may be used.

An Exemplary ACM Aware Traffic Manager

FIG. 1 is a block diagram of an Adaptive Code and Modulation (ACM) aware traffic manager 100 according to an exemplary embodiment of the present disclosure.

In an exemplary embodiment, the ACM aware traffic manager may be a Broadcom Corporation BCM85620 integrated circuit. The Broadcom Corporation BCM85620 is provided for illustrative purposes only, and it is not intended to be the only integrated circuit capable of being used herein, and is not meant to limit this disclosure. In particular, any integrated circuit that meets the adaptive traffic management requirements described in this disclosure may be used.

ACM aware traffic manager 100 includes a switch assembly 102. The switch assembly 102 functions as a transmitter/receiver (transceiver). In particular, the switch assembly 102 may receive a first signal 104 over a wired connection 106, such as a fiber optic connection to provide an example, and may output a second signal 108 over a wireless link 110. The ACM aware traffic manager 100 may output the second signal 108 to a modem assembly 120. In an exemplary embodiment, the ACM aware traffic manager 100 may be positioned at an opposite end of the wireless link 110. In such an exemplary embodiment, the switch assembly 102 may receive the second signal 108 over the wireless link 110, and may output a third signal over a different wired connection. Further, the switch assembly 102 stores a current adaptive traffic manager configuration 112 that is currently being utilized by the ACM aware traffic manager 100.

The ACM aware traffic manager 100 also includes an adapting mechanism 114 that adaptively changes the current adaptive traffic manager configuration 112 according to current link conditions, a current ACM profile or upon detection of an ACM event, such as a wireless link capacity change or a change in a bit rate of the wireless link 110 to provide some examples; however, other ACM events may be possible without departing from the spirit and scope of the present disclosure. In an exemplary embodiment, the adapting mechanism 114 may store a plurality of alternate adaptive traffic manager configurations 116, which can change the current adaptive traffic manager configuration 112 stored in the switch assembly 102 upon detection of the ACM event. Additionally, the ACM aware traffic manager 100 includes a computing module 118 that performs the actual changing of the current adaptive traffic manager configuration 112. In particular, the computing module 118 operates to control how the switch assembly 102 adaptively changes upon detection of the ACM event. In an exemplary embodiment, the computing module 118 adaptively changes the current adaptive traffic manager configuration 112 stored in the switch assembly 102 in less than approximately 1 millisecond following detection of the ACM event without interrupting the payload flow.

Therefore, in such an exemplary embodiment, the ACM aware traffic manager 100 operates according to a bit rate of the second signal 108, which is output from the switch assembly 102. An output port of the ACM aware traffic manager 100 may be polled to determine the bit rate of the second signal 108, and any change in the bit rate of the second signal 108 may be detected by the modem assembly 120. The ACM aware traffic manager 100 is then updated based on the bit rate of the second signal 108, which represents the bit rate of the wireless link 110. In such an exemplary embodiment, the ACM aware traffic manager 100 may be updated on a continuous basis. In this regard, the modem assembly 120 changes the output bit rate of the second signal 108 according to the detected condition of the wireless link 110. Similarly, the modem assembly 120 performs the continuous updating of the ACM aware traffic manager 100 in accordance with the condition of the wireless link 110. Further, the ACM aware traffic manager 100 is updated with hitless protection, which means that the ACM aware traffic manager 100 is updated without any relationship to the amount of traffic on the wireless link 110.

In an exemplary embodiment, the active profiles 112 may include: Quality of Service (QoS); 8 Class of Service Queues (CoSq) per egress port; Port Shaping and Queue Shaping; Scheduler SP, RR/WRR, FQ/WFQ, DRR; Packet Classification per P-bit; and Weighted Random Early Detection (WRED) per queue. The 8 CoSq per egress port may total up to approximately 64 queues, and the number of WRED profiles may reach up to 32. Further, the ACM aware traffic manager 100 may support up to 3 levels of scheduling.

An Exemplary ACM Aware Traffic Manager Utilized for Video Services

Figure 2:
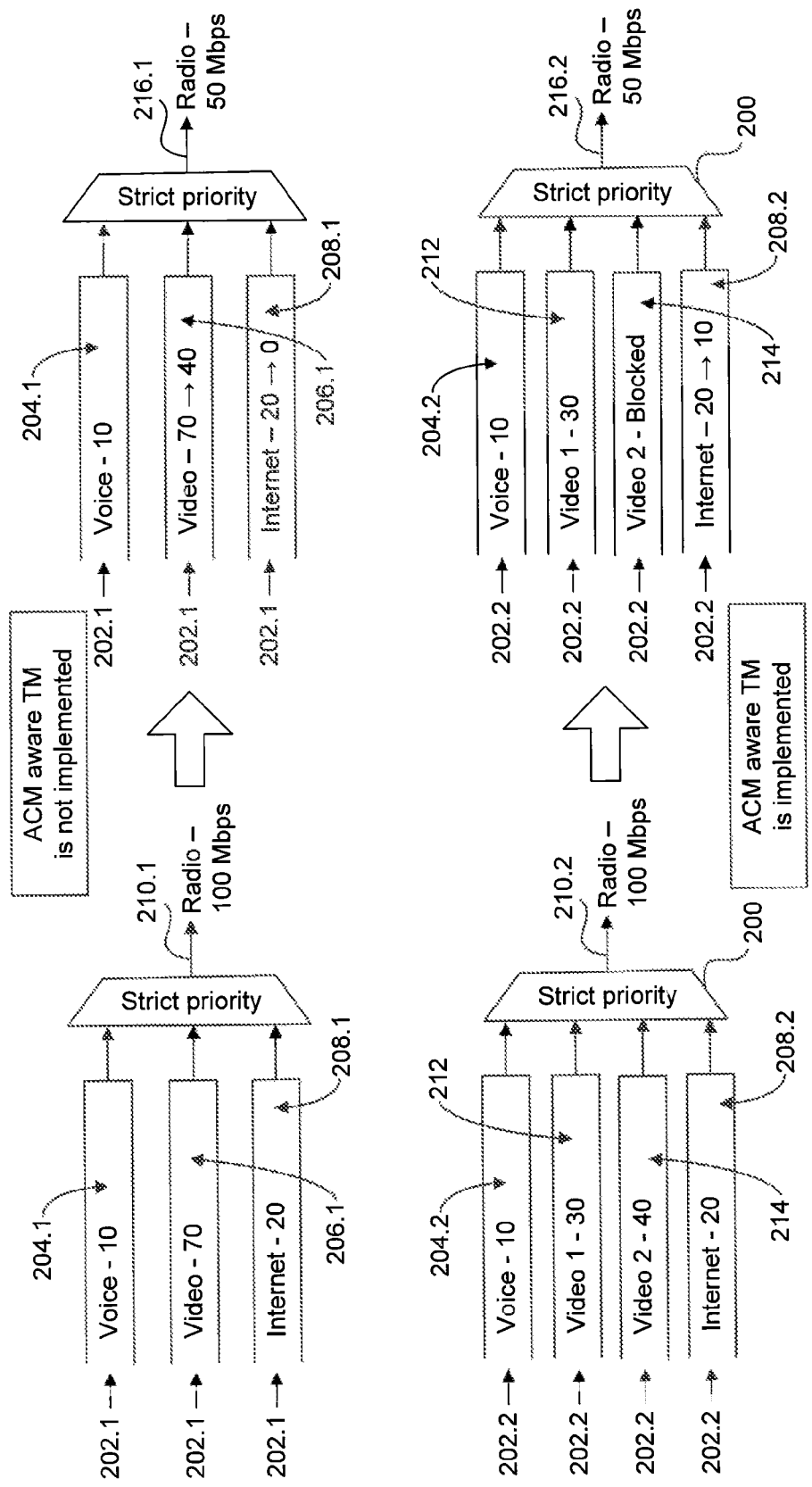
FIG. 2 is a schematic diagram of a ACM aware traffic manager utilized for video services according to an exemplary embodiment of the invention.

FIG. 2 is a schematic diagram of an ACM aware traffic manager 200 utilized for video services according to an exemplary embodiment of the present disclosure. The ACM aware traffic manager 200 may represent an exemplary embodiment of the ACM aware traffic manager 100. The following disclosure will describe the application of the ACM aware traffic manager 200 to a video service with reference to normal radio links 210.1 and 210.2 each having bandwidths of 100 Mbps, and reduced radio links 216.1 and 216.2 each having bandwidths of 50 Mbps. However, it will be apparent to those skilled in the related art(s) that other bandwidths are possible without departing from the spirit and scope of the present disclosure. Additionally, each of the specific bandwidths allocated to each of the service packets are provided for illustrative purposes only, and they are not intended to be the only possible bandwidths for each of the service packets, and they are not mean to limit this disclosure.

In an exemplary embodiment, a plurality of service packets 202.1 and 202.2 may designated for transmission over the radio links 210.1 and 210.2, respectively. Each of the service packets 202.1 may include one of a voice service packet 204.1, a video service packet 206.1, or an Internet service packet 208.1. Additionally, each of the service packets 202.2 may include one of a voice service packet 204.2, a first video service packet 212, a second video service packet 214, or an Internet service packet 208.2. The ACM aware traffic manager 200 may then allocate specific bit rates for each of the service packets 202.1 and 202.2 based on a set of priorities designated for each service packet 202.1 and 202.2. These priorities may be stored within the ACM aware traffic manager 200. Each of the prioritized service packets 202.1 and 202.2 are then transmitted over the radio links 210.1 and 210.2, respectively.

In an exemplary embodiment, the ACM aware traffic manager 200 may designate the voice service packets 204.1 and 204.2 as having a highest priority, the video service packets 206.1, 212, and 214 as having a next highest priority, and the Internet service packets 208.1 and 208.2 as having a lowest priority; however other priorities may be designated to each of the service packets 202.1 and 202.2 without departing from the spirit and scope of the present disclosure.

Referring to the top half of FIG. 2, an exemplary embodiment of a reduction in bandwidth is shown as the reduced radio link 216.1, in which the ACM aware traffic manager 200 is not implemented. In such an exemplary embodiment where the ACM aware traffic manager 200 is not implemented, upon a reduction in bandwidth (reduced radio link 216.1), the video service packet 206.1 may not function properly (e.g. poor video performance) and the Internet service packet 208.1 may be completely blocked, because of the relatively low priorities of the video service packet 206.1 and the Internet service packet 208.1. However, by implementing the ACM aware traffic manager 200 a more efficient reaction to the reduction in bandwidth (reduced radio link 216.1) can be achieved.

Referring also to the lower half of FIG. 2, an exemplary embodiment of a reduction in bandwidth is shown as the reduced radio link 216.2, in which the ACM aware traffic manager 200 is implemented. In such an exemplary embodiment where the ACM traffic manager 200 is implemented, the video service packet 202.1 is divided into two separate packets—a most viewed channels packet (first video service packet 212) and a least viewed channels packet (second video service packet 214). Then upon the reduction in bandwidth (reduced radio link 216.2), the second video service packet 214 may be completely blocked. This will allow the Internet service packet 208.2 to still be transmitted, although the transmission of the Internet service packet 208.2 may be at a lower bandwidth. In such an exemplary embodiment, the ACM adaptive traffic manager 200 allows for each of the service packets 202.2 to be managed more efficiently, thus allowing a service provider to continue to provide all of its services (voice, video and Internet) even when a reduction in bandwidth (reduced radio link 216.2) has occurred.

An Exemplary ACM Aware Traffic Manager Utilized for Weighted Random Early Detection (WRED)

Figure 3:
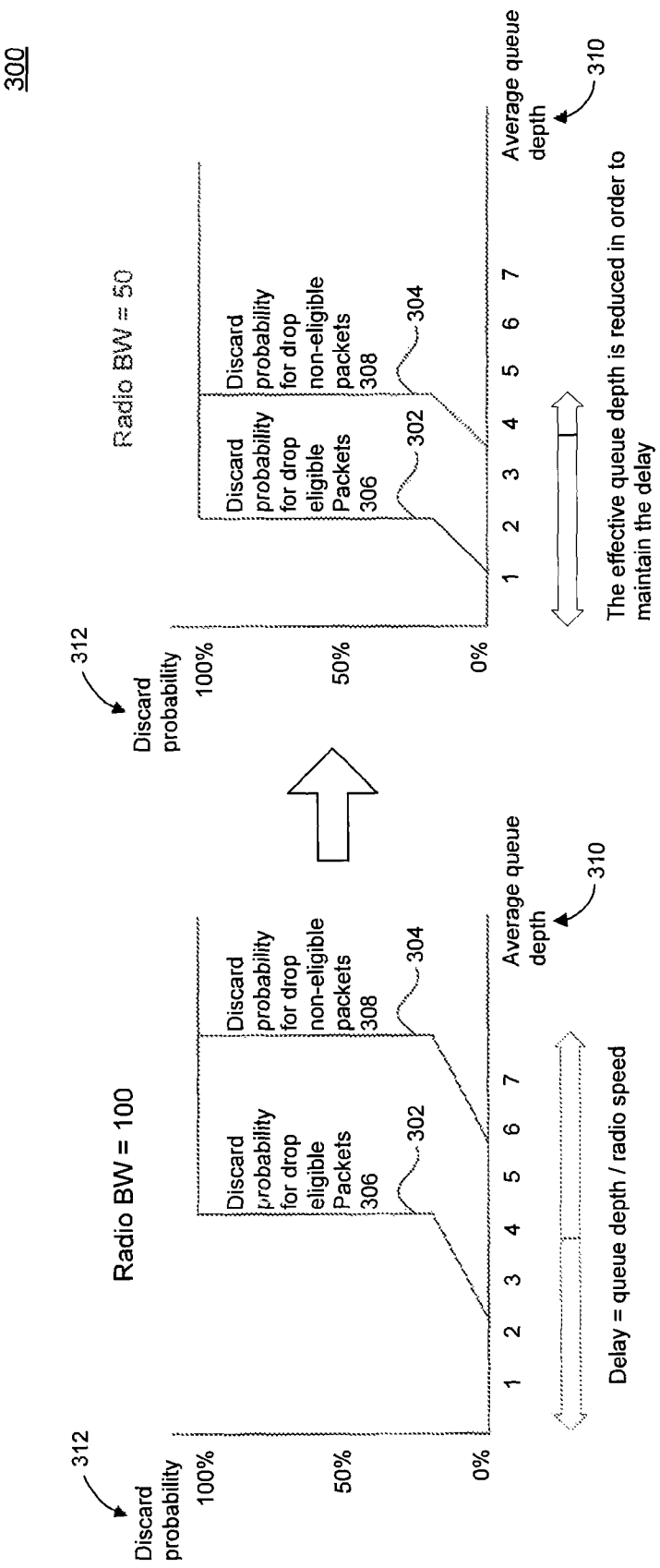
FIG. 3 is a schematic diagram showing a ACM aware traffic manager utilizing weighted random early detection (WRED) to preserve latency according to an exemplary embodiment of the invention.

FIG. 3 is a schematic diagram showing an ACM aware traffic manager 300 utilizing weighted random early detection (WRED) to preserve latency according to an exemplary embodiment of the present disclosure. The ACM aware traffic manager 300 may represent an exemplary embodiment of the ACM aware traffic manager 100. The following disclosure will describe the application of the ACM aware traffic manager 300 utilizing weighted random early detection (WRED) to preserve latency with reference to a normal radio bandwidth of 100 Mbps and a reduced radio bandwidth of 50 Mbps. However, it will be apparent to those skilled in the related art(s) that other bandwidths are possible without departing from the spirit and scope of the present disclosure. Additionally, the specific average depth queues are provided for illustrative purposes only, and they are not intended to be the only possible average depth queues, and they are not mean to limit this disclosure.

WRED is a queue management algorithm, which includes congestion avoidance capabilities. Therefore, WRED can be used to cope with congestion in data services—assuming transmission control protocol (TCP) is largely used. WRED is an extension to random early detection (RED) where a single queue may have several different queue thresholds 302 and 304, and where each queue threshold 302 and 304 is associated with a particular traffic class. In an exemplary embodiment, a queue may have a lower threshold 302 for lower priority packets (drop eligible packets 306), and a higher threshold 304 for higher priority packets (drop non-eligible packets 308). In such an exemplary embodiment, as an average queue depth 310 begins to buildup, the drop eligible packets 306 may be dropped, hence protecting the drop non-eligible packets 308 in the same queue. In this way, Quality of Service (QoS) prioritization is made possible for important packets from a pool of packets using the same buffer.

Additionally, WRED relates to implementing IP protocols, such as Precision Time Protocol (PTP) and User Datagram Protocol (UDP). PTP is a commonly used protocol when transferring files, while UDP is a commonly used protocol when transferring video packets. Each of these types of protocol is implemented to ensure that all of the transmitted packets will be received correctly at a receiving unit.

In an exemplary embodiment, the ACM aware traffic manager 300 is implemented to maintain the same transmission delay whether there is the normal radio bandwidth or the reduced radio bandwidth. In such an exemplary embodiment, the transmission delay may be calculated using the following equation:

Delay=Queue Depth/Radio Bandwidth.

Therefore, in the event of a reduction in radio bandwidth, the ACM aware traffic manager 300 reduces the average queue depth 310 to ensure that the transmission delay remains constant. In such an exemplary embodiment, both the lower threshold 302 and the higher threshold 304 are reduced, thus increasing a probability that both the drop eligible packets 306 and the drop non-eligible packets 308 will be dropped (shown as the discard probability 312 in FIG. 3). Therefore, the ACM aware traffic manager 300 controls the delay in the queue by continuously updating the WRED thresholds 302 and 304.

An Exemplary ACM Aware Traffic Manager Utilized for Weighted Fair Queuing (WFQ)

Figure 4:
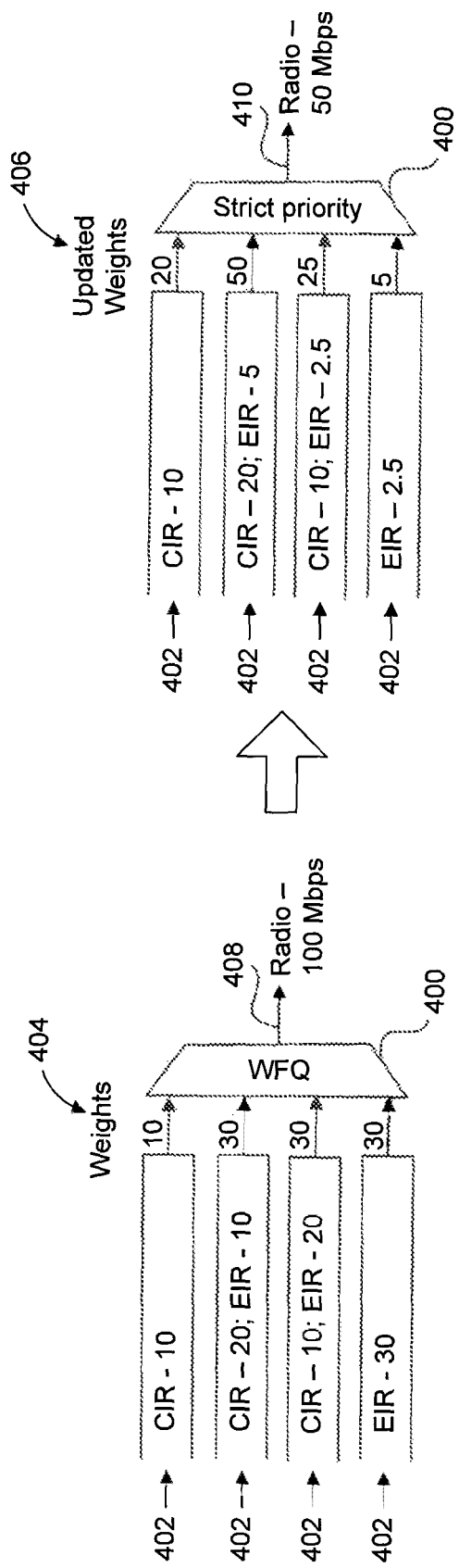
FIG. 4 is a schematic diagram of a ACM aware traffic manager utilizing weighted fair queuing (WFQ) to preserve a committed information rate (CIR) on bandwidth reduction according to an exemplary embodiment of the invention.

FIG. 4 is a schematic diagram of an ACM aware traffic manager 400 utilizing weighted fair queuing (WFQ) to preserve a committed information rate (CIR) on bandwidth reduction according to an exemplary embodiment of the present disclosure. The ACM aware traffic manager 400 may represent an exemplary embodiment of the ACM aware traffic manager 100. The following disclosure will describe the application of the ACM aware traffic manager 400 utilizing WFQ to preserve a CIR on bandwidth reduction with reference to a normal radio link 408 having a bandwidth of 100 Mbps, and a reduced radio link 410 having a bandwidth of 50 Mbps. However, it will be apparent to those skilled in the related art(s) that other bandwidths are possible without departing from the spirit and scope of the present disclosure. Additionally, each of the specific bandwidths allocated to each of the service packets are provided for illustrative purposes only, and they are not intended to be the only possible bandwidths for each of the service packets, and they are not mean to limit this disclosure.

WFQ is another mechanism utilized by the ACM aware traffic manager 400 to preserve the CIR. In particular, WFQ is a data packet scheduling technique assigning different scheduling priorities to statistically multiplexed data flows. The CIR represents a bit rate that a service provide is required to provide to its customer. Therefore, at any given time, the bandwidth should not fall below this CIR. Also, an excess information rate (FIR) is an allowance of burstable bandwidth, which may be provided by the service provider in addition to the CIR. Therefore, the service provider guarantees that a connection will always support the CIR rate, and sometimes the EIR rate provided that there is adequate bandwidth. Further, the CIR plus the EIR may be either equal to or less than the speed of an access port into a network.

The ACM aware traffic manager 400 may receive a plurality of service packets 402. Each of the service packets 402 may include the CIR, the EIR, or a combination of both the CIR and the EIR. The ACM aware traffic manager 400 may then allocate specific weights 404 to each of the service packets 402 based on the CIR and the EIR contained within each service packet 402. The weights 404 allocated to each service packet 402 may represent a percentage of a total bandwidth available on the radio link 408. In an exemplary embodiment, the specific weights 404 allocated to each service packet 402 must equal the total of the CIR plus any EIR assigned to that specific service packet 402. Each of the weighted service packets are transmitted over the radio link 408. In an exemplary embodiment where the same Class of Service Queues (CoS) are used for CIR and EIR bandwidth (drop eligible packets 306 and drop non-eligible packets 308), CIR bandwidth is guaranteed if:

Link_$BW$*Queue_Weight>=$CIR$ bandwidth.

In an exemplary embodiment where the bandwidth of the radio link 408 is reduced (shown as reduced radio link 410), then the ACM aware traffic manager 400 allocates updated weights 406 to each service packet 402 to support the CIR in each service packet 402. Therefore, the CIR in each service packet 402 remains the same, while the EIR in each service packet may change, and may be distributed among different service packets 402, and at different proportions, then previously existed prior to the bandwidth reduction. In such an exemplary embodiment, the updated weights 406 can be calculated using the following formula:

Updated Weight=CIR/Radio Bandwidth.

An Exemplary ACM Aware Traffic Manager Using Redirection

Figure 5:
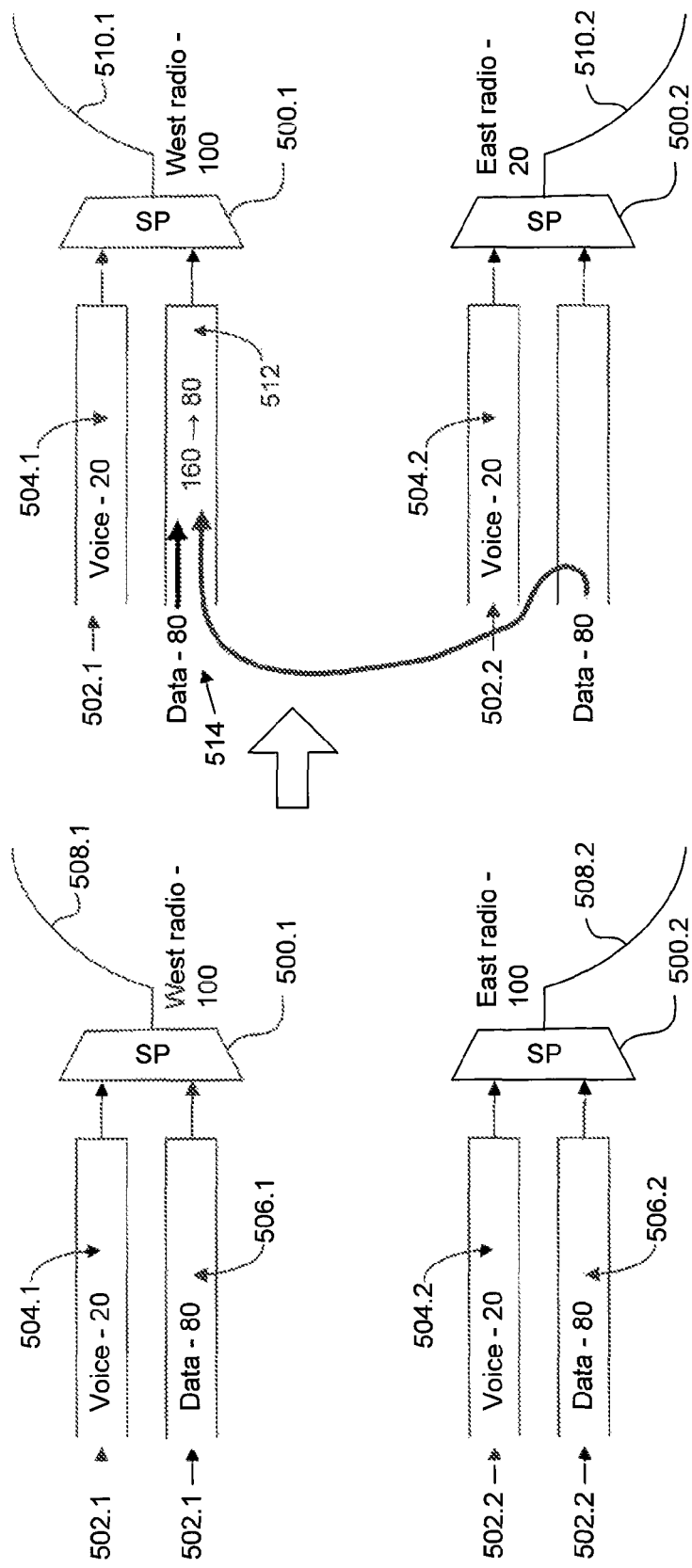
FIG. 5 is a schematic diagram of multiple ACM aware traffic managers using redirection according to an exemplary embodiment of the invention.

FIG. 5 is a schematic diagram of ACM aware traffic managers 500.1 and 500.2 using redirection according to an exemplary embodiment of the present disclosure. The ACM aware traffic managers 500.1 and 500.2 may each represent an exemplary embodiment of the ACM aware traffic manager 100. The following disclosure will describe the application of the ACM aware traffic managers 500.1 and 500.2 using redirection with reference to normal radio links 508.1, 508.2 and 510.1 each having bandwidths of 100 Mbps, and a reduced radio link 510.2 having a bandwidth of 50 Mbps. However, it will be apparent to those skilled in the related art(s) that other bandwidths are possible without departing from the spirit and scope of the present disclosure. Additionally, each of the specific bandwidths allocated to each of the service packets are provided for illustrative purposes only, and they are not intended to be the only possible bandwidths for each of the service packets, and they are not mean to limit this disclosure.

In exemplary embodiments where services can be transmitted through different links (e.g. link topology) the services may be redirected following a reduction in bandwidth of either a radio link 508.1 or 508.2. In an exemplary embodiment, this service redirection can be implemented by the ACM aware traffic managers 500.1 and 500.2.

The ACM aware traffic manager 500.1 is positioned at one end of the radio link 508.1, and the ACM aware traffic manager 500.2 is positioned at one end of the radio link 508.2. The ACM aware traffic manager 500.1 may receive a plurality of service packets 502.1. The plurality of service packets 502.1 may include either a voice service packet 504.1 or a data service packet 506.1. Also, the ACM aware traffic manager 500.2 may receive a plurality of service packets 502.2. The plurality of service packets 502.2 may include either a voice service packet 504.2 or a data service packet 506.2; however other service packets may be included in each of the service packets 502.1 and 502.2 without departing from the spirit and scope of the present disclosure. The ACM aware traffic managers 500.1 and 500.2 may then allocate specific bit rates for each of the service packets 502.1 and 502.2, respectively, based on a set of priorities designated for each service packet 502.1 and 502.2. These priorities may be stored within the ACM aware traffic managers 500.1 and 500.2. Each of the prioritized service packets 502.1 and 502.2 are then transmitted over the radio links 508.1 and 508.2, respectively. Further, radio links 508.1 and 508.2 may be connected to a common network.

In an exemplary embodiment, the ACM aware traffic managers 500.1 and 500.2 may designate the voice service packets 504.1 and 504.2 as having a highest priority and the data service packets 506.1 and 506.2 as having a lowest priority; however other priorities may be designated to each of the service packets 502.1 and 502.2 without departing from the spirit and scope of the present disclosure.

Referring to the right half of FIG. 5, an exemplary embodiment of a reduction in bandwidth of the radio link 508.2 is shown as reduced radio link 510.2. In such an exemplary embodiment, the voice service packet 504.2 is transmitted without any interruption. However, because of the reduction in bandwidth of the reduced radio link 508.2, the data service packet 506.2 is subject to being completely blocked. Therefore, the ACM aware traffic manager 500.2 redirects the data service packet 506.2 to be transmitted over the radio link 510.1. In such an exemplary embodiment, the data service packet 506.2 is combined with the data service packet 506.1 to form a combined data service packet 512. The bit rate for a service packet 514, which may now include the combined data service packet 512, is then reduced to match the available amount of bandwidth remaining on the radio link 510.1. Therefore, even when the bandwidth of either radio link 508.1 or radio link 508.2 is reduced, the ACM aware traffic managers 500.1 and 500.2 allow each of the service packets 502.1 and 502.2 to continue, while only reducing the bit rate of the combined data service packet 512.

An Exemplary Method of Optimizing Traffic Over a Wireless Link

Figure 6:
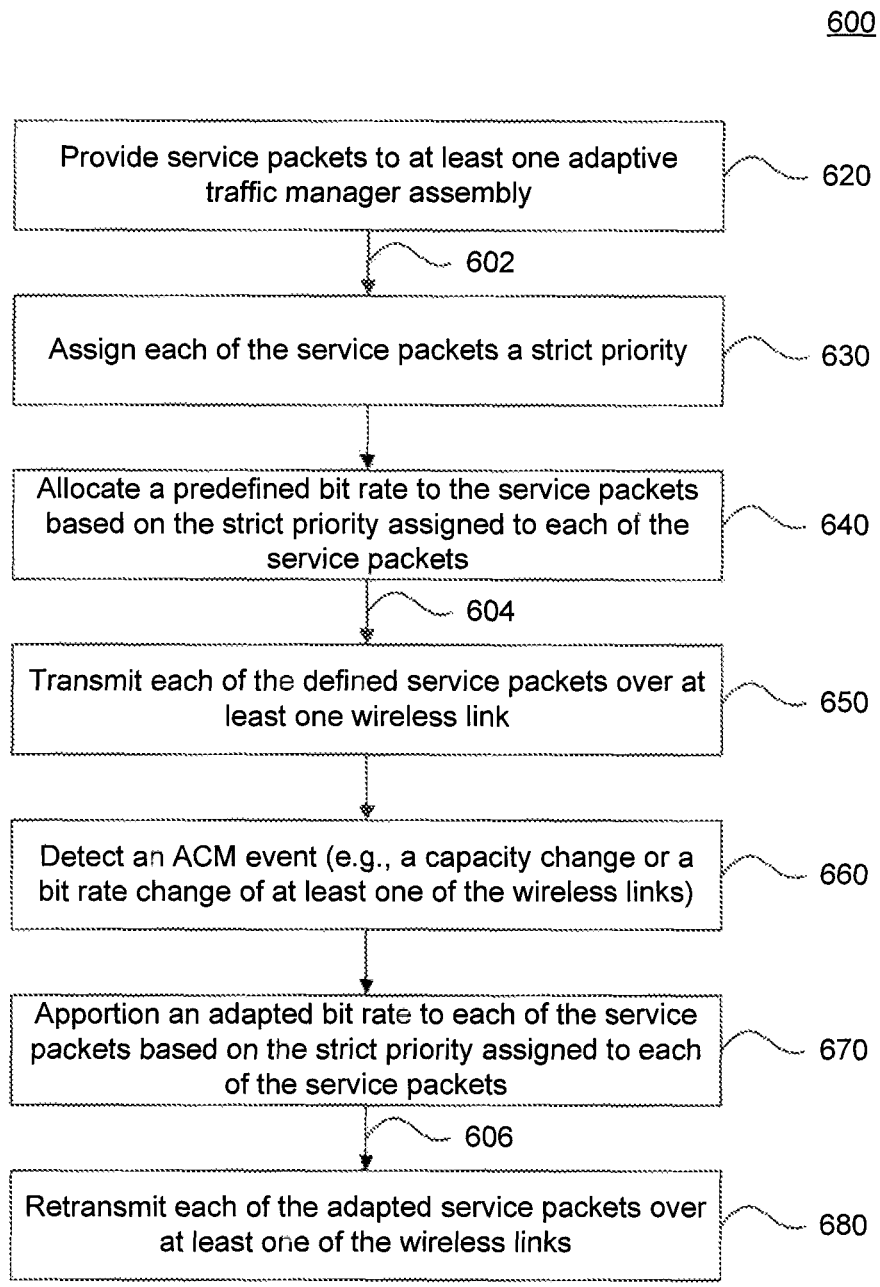
FIG. 6 is a flowchart of exemplary operation steps of utilizing a ACM aware traffic manager to optimize traffic over a wireless link according to an exemplary embodiment of the invention.

FIG. 6 is a flowchart of exemplary operation steps of utilizing an ACM aware traffic manager to optimize traffic over a wireless link according to an exemplary embodiment of the present disclosure. The disclosure is not limited to this operational description. Rather, it will be apparent to persons skilled in the relevant art(s) from the teachings herein that other operational control flows are within the scope and spirit of the present disclosure. The following discussion describes the steps in FIG. 6.

A method 600 begins at step 620, where a plurality of service packets 602 are provided to the ACM aware traffic manager 100. The method then proceeds to step 630. In step 630, each of the plurality of service packets 602 is assigned a strict priority. The strict priority may be stored within the ACM aware traffic manager 100, and the ACM aware traffic manager 100 may assign the strict priority to each of the plurality of service packets 602. The method then proceeds to step 640. In step 640, a predefined bit rate is allocated to each of the service packets 602 based on the strict priority assigned to each of the service packets 602. Following step 640, a plurality of predefined service packets 604 are formed. The method then proceeds to step 650. In step 650, each of the plurality of predefined service packets 604 are transmitted over at least one wireless link. The method then proceeds to step 660. In step 660, an ACM event (e.g. a capacity change or a bit rate change of at least one of the wireless links) is detected. The method then proceeds to step 670. In step 670, an adapted bit rate is apportioned to each of the service packets 602 based on the strict priority assigned to each of the service packets 602, and based on the bit rate change of at least one of the wireless links. Following step 670, a plurality of adapted service packets 606 are formed. The method proceeds to step 680. In step 680, each of the plurality of adapted service packets 606 are retransmitted over at least one of the wireless links.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. An adaptive traffic manager assembly, comprising:
   a computing module configured to operate on a current adaptive traffic manager configuration;
   an adapting mechanism configured to adaptively change the current adaptive traffic manager configuration upon a detection of an Adaptive Code and Modulation (ACM) event;
   a switch assembly configured to receive a first signal over a wired link, and to output a second signal over a wireless link, and configured to store the current adaptive traffic manager configuration; and
   a modem assembly, communicatively coupled to the switch assembly via the wireless link, configured to:
      poll an output port of the adaptive traffic manager assembly to determine a bit rate of the wireless link,
      detect the ACM event, and
      in response to the detection of the ACM event, initiate a change to a modulation and coding scheme associated with the current adaptive traffic manager configuration, in accordance with the determined bit rate of the wireless link.

2. The adaptive traffic manager assembly of claim 1, wherein the ACM event includes a capacity change or a bit rate change of the wireless link.

3. The adaptive traffic manager assembly of claim 2, wherein the capacity change of the wireless link is caused by an external weather condition surrounding the wireless link.

4. The adaptive traffic manager assembly of claim 2, wherein the change of the modulation and coding scheme occurs within approximately 1 millisecond following detection of the bit rate change of the wireless link.

5. The adaptive traffic manager assembly of claim 4, wherein the current adaptive traffic manager configuration includes at least one of: Quality of Service (QoS), Class of Service Queues (CoSq), Port Shaping and Queue Shaping, Weighted Fair Queue (WFQ) Scheduler, Packet Classification, and Weighted Random Early Detection (WRED).

6. The adaptive traffic manager assembly of claim 1, wherein the adapting mechanism stores a plurality of alternate adaptive traffic manager configurations, wherein the alternate adaptive traffic manager configurations replace the current adaptive traffic manager configuration stored in the switch assembly upon detection of the ACM event.

7. The adaptive traffic manager assembly of claim 6, wherein the plurality of alternate adaptive traffic manager configurations are stored in, an external storage medium.

8. The adaptive traffic manager assembly of claim 1, wherein the change to the modulation and coding scheme associated with the current adaptive traffic manager configuration occurs on a continuous basis.

9. The adaptive traffic manager assembly of claim 1, wherein the change to the modulation and coding scheme associated with the current adaptive traffic manager configuration results in a corresponding change to the determined bit rate of the wireless link.

10. The adaptive traffic manager assembly of claim 1, wherein the change to the modulation and coding scheme associated with the current adaptive traffic manager configuration is performed with hitless protection.

11. A method of optimizing traffic over a wireless link, comprising:
providing a plurality of service packets to at least one adaptive traffic manager assembly;
operating the at least one adaptive traffic manager assembly according to a current adaptive traffic manager configuration;
assigning each of the plurality of service packets a strict priority;
allocating a predefined bit rate to each of the plurality of service packets based on the strict priority assigned to each of the plurality of service packets to form a plurality of predefined service packets;
transmitting each of the plurality of predefined service packets over at least one wireless link;
detecting an Adaptive Code and Modulation (ACM) event, wherein the ACM event includes a capacity change or a bit rate change of the at least one wireless link;
selectively separating at least one of the plurality of service packets into at least two sub-service packets based on a frequency of use of individual services within the at least one service packet;
adaptively changing the current adaptive traffic manager configuration such that an adapted bit rate is apportioned to each of the plurality of service packets, and to the at least two sub-service packets, based on the strict priority assigned to each of the plurality of, service packets, and any sub-service packets, and based on the capacity change or the bit rate change to form a plurality of adapted service packets; and
retransmitting each of the plurality of adapted service packets over the at least one wireless link.

12. The method of claim 11, wherein the plurality of service packets include at least one of: voice service packets, video service packets, and internet service packets.

13. The method of claim 12, wherein the separating occurs after the detecting of the ACM event, but before the apportioning of the adapted bit rate to each of the plurality of service packets.

14. The method of claim 13,
wherein the strict priority assigned to each of the plurality of service packets are stored in the at least one adaptive traffic manager assembly,
wherein the assigning each of the plurality of service packets the strict priority is performed by the at least one adaptive traffic manager assembly based on a currently loaded active profile, and wherein the active profile includes at least one of: Quality of Service (QoS), Class of Service Queues (CoSq), Port Shaping and Queue Shaping, Weighted Fair Queue (WFQ) Scheduler, Packet Classification, and Weighted Random Early Detection (WRED).

15. The method of claim 11, wherein the apportioning the adapted bit rate to each of the plurality of service packets includes redirecting at least one service packet from a first wireless link, and combining the at least one redirected service packet with at least one service packet from a second wireless link, and wherein the first and second wireless links are connected to a common network.

16. The method of claim 11,
wherein the assigning each of the plurality of service packets the strict priority is performed based on a committed information rate (CIR) and an excess information rate (EIR) for each of the plurality of service packets,
wherein the allocating the predefined bit rate to each of the plurality of service packets includes allotting a weighted amount of a bit rate of the at least one wireless link to each of the plurality of service packets, and
wherein the apportioning the adapted bit rate to each of the plurality of service packets includes designating an updated weighted amount based on the bit rate change of the at least one wireless link.

17. The method of claim 11, wherein the apportioning the adapted bit rate to each of the plurality of service packets includes reducing an average queue depth by discarding at least one of the plurality of service packets based on the strict priority assigned to each of the plurality of service packets, and wherein the reducing the average queue depth maintains a constant transmission delay both before and after the ACM event.

18. An adaptive traffic manager system, comprising:
a first wireless communication device configured to change a current first adaptive traffic manager configuration according to an Adaptive Code and Modulation CACM) event;
a second wireless communication device configured to change a current second adaptive traffic manager configuration according to the ACM event,
wherein the first and second wireless communication devices communicate over an adaptive wireless link;
a first modem assembly electrically connected via the adaptive wireless link to an output port of the first wireless communication device; and
a second modem assembly electrically connected via the adaptive wireless link to an output port of the second wireless communication device,
wherein the first and second modem assemblies are configured to respectively poll the output ports of the first and second wireless communication devices to detect a capacity change or a bit rate change of the adaptive wireless link, and are further configured to detect the ACM event based on the detected capacity change or bit rate change of the adaptive wireless link.

19. The adaptive traffic manager system of claim 18, wherein the first and second wireless communication devices each include:
a switch assembly configured to receive a first signal over a wired link, to output a second signal over the adaptive wireless link, and to store its respective current adaptive traffic manager;
a storage unit configured to store a plurality of shadow configurations; and a computing module configured to load at least one of the plurality of shadow configurations into the switch assembly upon detection of the ACM event.

20. The adaptive traffic manager system of claim 19, wherein the first and second wireless communication devices each include a physical layer and a network layer, and wherein the physical layer and the network layer are configured to change the first and second current adaptive traffic manager configurations according to the ACM event.

21. The adaptive traffic manager system of claim 19, wherein the ACM event includes the capacity change or the bit rate change of the adaptive wireless link, and wherein the capacity change or the bit rate change of the adaptive wireless link is caused by an external weather condition surrounding the adaptive wireless link.

22. The adaptive traffic manager system of claim 21, wherein the plurality of shadow configurations are loaded into the switch assembly within approximately 1 millisecond to approximately 3 milliseconds following the detection of the ACM event.

23. The adaptive traffic manager system of claim 22, wherein the first and second current adaptive traffic manager configurations include at least one of: Quality of Service (QoS), Class of Service Queues (CoSq), Port Shaping and Queue Shaping, Weighted Fair Queue (WFQ) Scheduler, Packet Classification, and Weighted Random Early Detection (WRED).

* * * * *

UNITED STATES PATENT AND TRADEMARK OFFICE
CERTIFICATE OF CORRECTION

| | | |
|---|---|---|
| PATENT NO. | : 9,014,000 B2 | Page 1 of 1 |
| APPLICATION NO. | : 13/346198 | |
| DATED | : April 21, 2015 | |
| INVENTOR(S) | : Ran Soffer | |

It is certified that error appears in the above-identified patent and that said Letters Patent is hereby corrected as shown below:

In the Claims

Column 11, line 7, please replace "in, an" with --in an--

Column 11, line 47, please replace "of, service" with --of service--

Signed and Sealed this
Twenty-second Day of September, 2015

Michelle K. Lee
*Director of the United States Patent and Trademark Office*